United States Patent
Nardacci

(10) Patent No.: US 10,675,509 B1
(45) Date of Patent: Jun. 9, 2020

(54) GOLF BALLS HAVING A CORE LAYER MADE FROM COMPOSITIONS CONTAINING BOROPHENE

(71) Applicant: Acushnet Company, Fairhaven, MA (US)

(72) Inventor: Nicholas M. Nardacci, Barrington, RI (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 16/392,843

(22) Filed: Apr. 24, 2019

(51) Int. Cl.
*A63B 37/06* (2006.01)
*A63B 37/00* (2006.01)
*C08K 3/02* (2006.01)
*C08L 9/00* (2006.01)

(52) U.S. Cl.
CPC ...... *A63B 37/0051* (2013.01); *A63B 37/0063* (2013.01); *A63B 37/0069* (2013.01); *A63B 37/0075* (2013.01); *A63B 37/0092* (2013.01); *C08K 3/02* (2013.01); *C08L 9/00* (2013.01); *A63B 37/0074* (2013.01); *A63B 37/0076* (2013.01); *A63B 2037/0079* (2013.01); *C08L 2205/025* (2013.01); *C08L 2207/53* (2013.01)

(58) Field of Classification Search
CPC .......................... A63B 37/005; A63B 37/0039
USPC .......................................................... 473/371
See application file for complete search history.

(56) References Cited

U.S. PATENT DOCUMENTS

| | | |
|---|---|---|
| 9,393,462 B2 | 7/2016 | Farrell |
| 9,789,366 B1 | 10/2017 | Chavan et al. |
| 9,956,455 B1 | 5/2018 | Chavan et al. |
| 10,039,959 B2 | 8/2018 | Chavan et al. |
| 10,052,524 B1 | 8/2018 | Chavan et al. |

OTHER PUBLICATIONS

Brookhaven National Laboratory; Borophene advances as 2-D materials platform; https://phys.org/news/2018-12-borophene-advances-d-materials-platform.html; dated Dec. 3, 2018; pp. 1-6.
Emerging Technology From the ARXIV; Sorry, graphene-borophene is the new wonder material that's got everyone excited; https://www.technologyreview.com/s/613267/borophene-the-new; dated Apr. 5, 2019; pp. 1-4.
Jon Atherton; YaleNews; Yale scientists make a borophene breakthrough; https://news.yale.edu/2018/12/03/yale-scientists-make-borophene-breakthrough; dated Dec. 3, 2018; pp. 1-4.

*Primary Examiner* — Raeann Gorden
(74) *Attorney, Agent, or Firm* — Mandi B. Milbank

(57) ABSTRACT

Golf balls comprising a core having at least one layer and a cover having at least one layer are provided. At least one of the layers is made from a thermoplastic composition preferably comprising a borophene material. Mixtures of borophene material and polybutadiene rubbers or ethylene acid copolymers can be prepared. The borophene-containing compositions can be used to make a core layer having good strength and impact durability and it also should help provide the ball with high resiliency.

14 Claims, 2 Drawing Sheets

GOLF BALLS HAVING A CORE LAYER MADE FROM COMPOSITIONS CONTAINING BOROPHENE

BACKGROUND OF THE INVENTION

Field of the Invention

The present invention relates generally to multi-piece golf balls comprising a core having at least one layer and a cover having at least one layer. At least one of the core layers is made from a composition comprising borophene.

Brief Review of the Related Art

Multi-layered, solid golf balls are used today by golfers. In general, these golf balls contain a single or multi-layered core protected by a cover. The core acts as the primary engine for the ball and the cover protects the core and helps provide the ball with durability and wear-resistance. For example, three-piece golf balls having an inner core, outer core, and outer cover layer are popular. In other instances, golfers will use a four-piece ball containing a dual-core sub-assembly (inner core and surrounding outer-core layer) and dual-cover (inner cover layer and surrounding outer cover layer). Intermediate layer(s) may be disposed between the core and cover layers to impart various properties. Thus, five-piece and even six-piece balls can be made. Normally, the core layers are made of a natural or synthetic rubber material or an acid copolymer ionomer. These ionomer polymers are typically copolymers of ethylene and methacrylic acid or acrylic acid that are partially or fully-neutralized.

The single or multi-layered core acts as an engine or spring for the ball. Thus, the composition and construction of the core is a key factor in determining the resiliency and rebounding performance of the ball. In general, the rebounding performance of the ball is determined by calculating its initial velocity after being struck by the face of the golf club and its outgoing velocity after making impact with a hard surface. More particularly, the "Coefficient of Restitution" or "COR" of a golf ball refers to the ratio of a ball's rebound velocity to its initial incoming velocity when the ball is fired out of an air cannon into a rigid vertical plate. The COR for a golf ball is written as a decimal value between zero and one. A golf ball may have different COR values at different initial velocities. The United States Golf Association (USGA) sets limits on the initial velocity of the ball so one objective of golf ball manufacturers is to maximize COR under such conditions. Balls with a higher rebound velocity have a higher COR value. Such golf balls rebound faster, retain more total energy when struck with a club, and have longer flight distance as opposed to balls with low COR values. These properties are particularly important for long distance shots. For example, balls having high resiliency and COR values tend to travel a far distance when struck by a driver club from a tee.

The durability, spin rate, and feel of the ball also are important properties. In general, the durability of the ball refers to the impact-resistance of the ball. Balls having low durability appear worn and damaged even when such balls are used only for brief time periods. In some instances, the cover may be cracked or torn. The spin rate refers to the ball's rate of rotation after it is hit by a club. Balls having a relatively high spin rate are advantageous for short distance shots made with irons and wedges. Professional and highly skilled amateur golfers can place a back spin more easily on such balls. This helps a player better control the ball and improves shot accuracy and placement. By placing the right amount of spin on the ball, the player can get the ball to stop precisely on the green or place a fade on the ball during approach shots. On the other hand, recreational players who cannot intentionally control the spin of the ball when hitting it with a club are less likely to use high spin balls. For such players, the ball can spin sideways more easily and drift far-off the course, especially if it is hooked or sliced. Meanwhile, the "feel" of the ball generally refers to the sensation that a player experiences when striking the ball with the club and it is a difficult property to quantify. Many players prefer balls having a soft feel, because the player experience a more natural and comfortable sensation when their club face makes contact with these balls. Balls having a softer feel are particularly desirable when making short shots around the green, because the player senses more with such balls. The feel of the ball primarily depends upon the hardness and compression of the ball.

As noted above, in recent years, three-piece and four-piece balls have become more popular. New manufacturing technologies, lower material costs, and desirable playing performance properties have contributed to these multi-piece balls becoming more popular. Many golf balls used today have multi-layered cores comprising an inner core and at least one surrounding outer core or intermediate layer. Manufacturers of golf balls are constantly looking to different materials and ball constructions for improving the playing performance and other properties of the ball.

SUMMARY OF THE INVENTION

The present invention generally relates to multi-layered golf balls and more particularly to golf balls comprising a core having at least one layer and a cover having at least one layer. At least one of the core layers is made from a composition comprising borophene. In one preferred embodiment, at least one of the core layers is formed of a composition comprising borophene. More particularly, the composition contains borophene dispersed in a thermoset or thermoplastic polymer matrix. For example, polybutadiene rubber or an ethylene acid copolymer ionomer can be used.

another embodiment, the ball contains a dual-core sub-assembly comprising an inner core (center) and surrounding outer core layer. In one version, both the inner core and outer core are formed of the borophene composition. In a second version, a thermoset (for example, polybutadiene rubber) or thermoplastic composition containing borophene can be used to form the inner core; while, a thermoset or thermoplastic composition, which does not contain borophene, can be used to make the outer core layer. In yet another version, a thermoset (for example, polybutadiene rubber) or thermoplastic composition containing borophene can be used to form the outer core; while, a thermoset or thermoplastic composition, which does not contain borophene, can be used to make the inner core.

Preferably, the borophene-containing composition contains about 0.1 to about 10.0 weight percent borophene based on total weight of the composition. The borophene should be dispersed homogenously in the thermoset or thermoplastic matrix. The borophene material is very flexible, strong, and lightweight. It is believed that adding the borophene to composition helps make the composition stronger and helps improve the impact durability of the outer core (or other golf ball layer) formed by the composition.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description in connection with the accompanying drawings in which:

DETAILED DESCRIPTION OF THE INVENTION

Golf Ball Constructions

Figure 1:
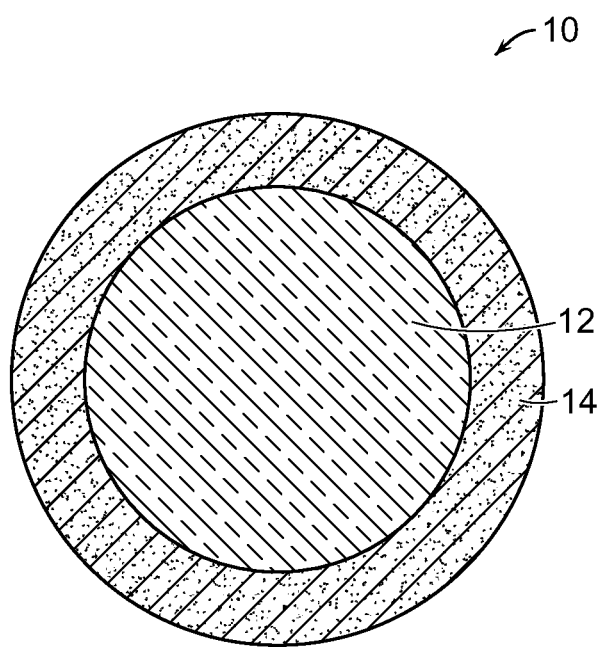
FIG. 1 is a cross-sectional view of a two-layered core for a golf ball made in accordance with the present invention.

Golf balls having various constructions may be made in accordance with this invention. For example, golf balls having one-piece, two-piece, three-piece, four-piece, and five or more-piece constructions with the term "piece" referring to any core, cover or intermediate layer of a golf ball construction. Representative illustrations of such golf ball constructions are provided and discussed further below. The term, "layer" as used herein means generally any spherical portion of the golf ball. More particularly, in one version, a one-piece ball is made using the inventive composition as the entire golf ball excluding any paint or coating and indicia applied thereon. In a second version, a two-piece ball comprising a single core and a single cover layer is made. In a third version, a three-piece golf ball containing a dual-layered core and single-layered cover is made. The dual-core includes an inner core (center) and surrounding outer core layer. In another version, a three-piece ball containing a single core layer and two cover layers is made. In yet another version, a four-piece golf ball containing a dual-core and dual-cover (inner cover and outer cover layers) is made. In yet another construction, a four-piece or five-piece golf ball containing a dual-core; an intermediate layer, an inner cover layer, and an outer cover layer, may be made. In still another construction, a five-piece ball is made containing an innermost core layer (or center), an intermediate core layer, an outer core layer, an inner cover layer and an outer cover layer. The diameter and thickness of the different layers along with properties such as hardness and compression may vary depending upon the construction and desired playing performance properties of the golf ball. Any one or more of the layers of any of the one, two, three, four, or five, or more-piece (layered) balls described above may comprise the borophene-containing composition as described herein. That is, any of the inner (center) core and/or outer core layers, and/or inner, intermediate, or outer cover layers may comprise the borophene-containing composition of this invention.

Core Structure

The golf ball may contain a single- or multi-layered core. In one preferred embodiment, at least one of the core layers is formed of a composition comprising borophene. More particularly, the composition contains borophene dispersed in a thermoset or thermoplastic polymer matrix. For example, in one version, the ball contains a single inner core formed of a rubber (preferably, polybutadiene rubber)/borophene composition. In a second version, the single inner core is formed of a thermoplastic polymer/borophene composition. Suitable thermoplastic polymers are described further below.

In another embodiment, the ball contains a dual-core sub-assembly comprising an inner core (center) and surrounding outer core layer. In one version, both the inner core and outer core are formed of the borophene composition. That is, a thermoset (for example, polybutadiene rubber) or thermoplastic composition containing borophene can be used to form the inner and outer core layers. In a second version, a thermoset (for example, polybutadiene rubber) or thermoplastic composition containing borophene can be used to form the inner core; while, a thermoset or thermoplastic composition, which does not contain borophene, can be used to make the outer core layer. In yet another version, a thermoset (for example, polybutadiene rubber) or thermoplastic composition containing borophene can be used to form the outer core; while, a thermoset or thermoplastic composition, which does not contain borophene, can be used to make the inner core.

By the term, "borophene", as used herein, it is meant to refer exclusively to "borophene" and excludes graphene and other existing two-dimensional materials. Preferably, the borophene-containing composition contains about 0.1 to about 10.0 weight percent borophene based on total weight of the composition. In a second preferred embodiment, the borophene material is present in an amount of about 0.2 to about 6.0 weight percent; and in a third preferred embodiment, the borophene material is present in an amount of about 0.4 to about 3.0 weight percent; or about 0.8 to about 2.0 weight %. The borophene material can be in any suitable form including, but not limited to, flakes, fibers, whiskers, fibrils, plates, sheets, particles, and powders. The borophene material should be dispersed homogenously to prevent or minimize the tendency of the material to stick together and form aggregates. Also, good dispersion is important, because it means the composition can be molded more easily into a golf ball core or other ball component.

Only recently, has borophene been synthesized using chemical vapor deposition. In this process, a hot gas of boron atoms condenses onto a cool surface of silver. Borophene has a hexagonal network made of boron atoms on each of the six vertices—the boron atoms can bind to as many as six other atoms to create a flat, hexagonal structure. However, borophene periodically has an extra boron atom in the center of the structure and this gives borophene crystals their unique properties. It has been reported that borophene is extremely flexible, strong, and lightweight—even more so that its carbon-based analogue, graphene. Borophene can have a thickness of one atom and can be flexible. Also, borophene can be thermally conductive, electrically conductive, and/or mechanically conductive (e.g., borophene can transfer mechanical energy from movements). In fact, in some embodiments, borophene may be highly conductive and potentially superconductive. Thus, the borophene material can be used to collect electrical energy. These borophene materials can have high surface-to-mass ratios and can be used for solar cells, small transistors, tough screens, and batteries. See, "Borophene Advances as 2-D Materials Platform", *Brookhaven National Laboratory,* 3 Dec. 2018.

In the present invention, the borophene material can be used in any of the golf ball layers. For example, the inner core may be made of a relatively soft and resilient material such as polybutadiene rubber, while the outer core or intermediate layer can be made of borophene—this is a harder and more rigid material. In this instance, the firm borophene material acts as reinforcing agent and makes the outer core layer stronger with enhanced impact durability. The resulting ball should have good spin control and improved distance performance. Different hardness gradients for the inner core and outer core layers are discussed further below. Also, the compression of the finished ball can vary. In one example, the compression is in the range of about 25 to about 110. In a preferred example, the compression is preferably about 40 to about 90 or about 50 to 80.

It is believed that adding the borophene to composition helps make the composition stronger and helps improve the impact durability of the outer core (or other golf ball layer) formed by the composition. Adding the borophene to the composition helps increase the stiffness of the composition. That is, the borophene helps raise the flex modulus of the composition. The flex modulus refers to the ratio of stress to strain within the elastic limit (when measured in the flexural mode) and is similar to tensile modulus. This property is used to indicate the bending stiffness of a material. The flexural modulus, which is a modulus of elasticity, is determined by calculating the slope of the linear portion of the stress-strain curve during the bending test. If the slope of the stress-strain curve is relatively steep, the material has a relatively high flexural modulus meaning the material resists deformation. The material is more rigid. If the slope is relatively flat, the material has a relatively low flexural modulus meaning the material is more easily deformed. The material is more flexible. The flex modulus can be determined in accordance with ASTM D790 standard among other testing procedures.

Thus, in one embodiment, the borophene-containing composition has a flex modulus in the range of about 60 to about 120 MPa. In another preferred embodiment, the borophene-containing composition has a flex modulus in the range of about 70 to about 110 MPa; and in a third preferred embodiment, it has a flex modulus in the range of about 80 to about 100 MPa. In general, the properties of flex modulus and hardness are related, whereby flex modulus measures the material's resistance to bending, and hardness measures the material's resistance to indentation. In general, as the flex modulus of the material increases, the hardness of the material also increases. As discussed above, adding the borophene to the composition helps increase the flex modulus of the composition and it also helps increases hardness to a certain degree.

As discussed above, in one version, the core is formed of a rubber composition comprising a rubber material such as, for example, polybutadiene, ethylene-propylene rubber, ethylene-propylene-diene rubber, polyisoprene, styrene-butadiene rubber, polyalkenamers, butyl rubber, halobutyl rubber, or polystyrene elastomers. For example, polybutadiene rubber compositions may be used to form the inner core (center) and/or surrounding outer core layer in a dual-layer construction. In another version, the inner core and/or outer core may be formed from an ionomer composition comprising an ethylene acid copolymer containing acid groups such that greater than 70% of the acid groups are neutralized. For example, a polybutadiene rubber composition may be used to form the center and a HNP composition may be used to form the outer core. Such rubber and HNP compositions are discussed in further detail below.

In general, polybutadiene is a homopolymer of 1, 3-butadiene. The double bonds in the 1, 3-butadiene monomer are attacked by catalysts to grow the polymer chain and form a polybutadiene polymer having a desired molecular weight. Any suitable catalyst may be used to synthesize the polybutadiene rubber depending upon the desired properties. Normally, a transition metal complex (for example, neodymium, nickel, or cobalt) or an alkyl metal such as alkyl-lithium is used as a catalyst. Other catalysts include, but are not limited to, aluminum, boron, lithium, titanium, and combinations thereof. The catalysts produce polybutadiene rubbers having different chemical structures. In a cis-bond configuration, the main internal polymer chain of the polybutadiene appears on the same side of the carbon-carbon double bond contained in the polybutadiene. In a trans-bond configuration, the main internal polymer chain is on opposite sides of the internal carbon-carbon double bond in the polybutadiene. The polybutadiene rubber can have various combinations of cis- and trans-bond structures. A preferred polybutadiene rubber has a 1,4 cis-bond content of at least 40%, preferably greater than 80%, and more preferably greater than 90%. In general, polybutadiene rubbers having a high 1,4 cis-bond content have high tensile strength. The polybutadiene rubber may have a relatively high or low Mooney viscosity.

Examples of commercially-available polybutadiene rubbers that can be used in accordance with this invention, include, but are not limited to, BR 01 and BR 1220, available from BST Elastomers of Bangkok, Thailand; SE BR 1220LA and SE BR1203, available from DOW Chemical Co of Midland, Mich.; BUDENE 1207, 1207s, 1208, and 1280 available from Goodyear, Inc of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, and CB 1221, available from Lanxess Corp. of Pittsburgh. Pa.; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEO-CIS BR 60, INTENE 60 AF and P3OAF, and EUROPRENE BR HV80, available from Polimeri Europa of Rome, Italy; AFDENE 50 and NEODENE BR40, BR45, BR50 and BR60, available from Karbochem (PTY) Ltd. of Bruma, South Africa; KBR 01, NdBr 40, NdBR-45, NdBr 60, KBR 710S, KBR 710H, and KBR 750, available from Kumho Petrochemical Co., Ltd. Of Seoul, South Korea; and DIENE 55NF, 70AC, and 320 AC, available from Firestone Polymers of Akron, Ohio.

To form the core, the polybutadiene rubber is used in an amount of at least about 5% by weight based on total weight of composition and is generally present in an amount of about 5% to about 100%, or an amount within a range having a lower limit of 5% or 10% or 20% or 30% or 40% or 50% and an upper limit of 55% or 60% or 70% or 80% or 90% or 95% or 100%. In general, the concentration of polybutadiene rubber is about 45 to about 95 weight percent. Preferably, the rubber material used to form the core layer comprises at least 50% by weight, and more preferably at least 70% by weight, polybutadiene rubber.

The rubber compositions of this invention may be cured, either by pre-blending or post-blending, using conventional curing processes. Suitable curing processes include, for example, peroxide-curing, sulfur-curing, high-energy radiation, and combinations thereof. Preferably, the rubber composition contains a free-radical initiator selected from organic peroxides, high energy radiation sources capable of generating free-radicals, and combinations thereof. In one preferred version, the rubber composition is peroxide-cured. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide;

2,5-dimethyl-2,5-di(t-butylperoxy)hexyne-3; di(2-t-butylperoxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel. Peroxide free-radical initiators are generally present in the rubber composition in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the total rubber. Concentrations are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

The rubber compositions preferably include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, and nickel. In a particular embodiment, the co-agent is selected from zinc salts of acrylates, diacrylates, methacrylates, and dimethacrylates. In another particular embodiment, the agent is zinc diacrylate (ZDA). When the co-agent is zinc diacrylate and/or zinc dimethacrylate, the co-agent is typically included in the rubber composition in an amount within the range having a lower limit of 1 or 5 or 10 or 15 or 19 or 20 parts by weight per 100 parts of the total rubber, and an upper limit of 24 or 25 or 30 or 35 or 40 or 45 or 50 or 60 parts by weight per 100 parts of the base rubber.

Radical scavengers such as a halogenated organosulfur or metal salt thereof, organic disulfide, or inorganic disulfide compounds may be added to the rubber composition. These compounds also may function as "soft and fast agents." As used herein, "soft and fast agent" means any compound or a blend thereof that is capable of making a core: 1) softer (having a lower compression) at a constant "coefficient of restitution" (COR); and/or 2) faster (having a higher COR at equal compression), when compared to a core equivalently prepared without a soft and fast agent. Preferred halogenated organosulfur compounds include, but are not limited to, pentachlorothiophenol (PCTP) and salts of PCTP such as zinc pentachlorothiophenol (ZnPCTP). Using PCTP and ZnPCTP in golf ball inner cores helps produce softer and faster inner cores. The PCTP and ZnPCTP compounds help increase the resiliency and the coefficient of restitution of the core. In a particular embodiment, the soft and fast agent is selected from ZnPCTP, PCTP, ditolyl disulfide, diphenyl disulfide, dixylyl disulfide, 2-nitroresorcinol, and combinations thereof.

The rubber compositions of the present invention also may include non-borophene "fillers," which are added to adjust the density and/or specific gravity of the material. These fillers would be added to the composition in addition to the borophene material as discussed above. Rubber regrind, which is ground, recycled rubber material (for example, ground to about 30 mesh particle size) obtained from discarded rubber golf ball cores, also can be used as a filler. The amount and type of fillers utilized are governed by the amount and weight of other ingredients in the golf ball, since a maximum golf ball weight of 45.93 g (1.62 ounces) has been established by the United States Golf Association (USGA).

Suitable polymeric or mineral fillers that may be added to the rubber composition include, for example, precipitated hydrated silica, clay, talc, asbestos, glass fibers, aramid fibers, mica, calcium metasilicate, barium sulfate, zinc sulfide, lithopone, silicates, silicon carbide, tungsten carbide, diatomaceous earth, polyvinyl chloride, carbonates such as calcium carbonate and magnesium carbonate. Suitable metal fillers include titanium, tungsten, aluminum, bismuth, nickel, molybdenum, iron, lead, copper, boron, cobalt, beryllium, zinc, and tin. Suitable metal alloys include steel, brass, bronze, boron carbide whiskers, and tungsten carbide whiskers. Suitable metal oxide fillers include zinc oxide, iron oxide, aluminum oxide, titanium oxide, magnesium oxide, and zirconium oxide. Suitable particulate carbonaceous fillers include graphite, carbon black, cotton flock, natural bitumen, cellulose flock, and leather fiber. Micro balloon fillers such as glass and ceramic, and fly ash fillers can also be used. In a particular aspect of this embodiment, the rubber composition includes filler(s) selected from carbon black, nanoclays (e.g., Cloisite® and Nanofil® nanoclays, commercially available from Southern Clay Products, Inc., and Nanomax® and Nanomer® nanoclays, commercially available from Nanocor, Inc.), talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), and combinations thereof. In a particular embodiment, the rubber composition is modified with organic fiber micropulp.

In addition, the rubber compositions may include antioxidants to prevent the breakdown of the elastomers. Also, processing aids such as high molecular weight organic acids and salts thereof, may be added to the composition. In a particular embodiment, the total amount of additive(s) and filler(s) present in the rubber composition is 15 wt % or less, or 12 wt % or less, or 10 wt % or less, or 9 wt % or less, or 6 wt % or less, or 5 wt % or less, or 4 wt % or less, or 3 wt % or less, based on the total weight of the rubber composition.

The polybutadiene rubber material (base rubber) may be blended with other elastomers in accordance with this invention. Other elastomers include, but are not limited to, polybutadiene, polyisoprene, ethylene propylene rubber ("EPR"), styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof.

The polymers, free-radical initiators, filler, cross-linking agents, and any other materials used in forming either the golf ball center or any portion of the core, in accordance with invention, may be combined to form a mixture by any type of mixing known to one of ordinary skill in the art. Suitable types of mixing include single pass and multi-pass mixing, and the like. The cross-linking agent, and any other optional additives used to modify the characteristics of the golf ball center or additional layer(s), may similarly be combined by any type of mixing. A single-pass mixing process where ingredients are added sequentially is preferred, as this type of mixing tends to increase efficiency and reduce costs for the process. The preferred mixing cycle is single step wherein the polymer, cis-to-trans catalyst, filler, zinc diacrylate, and peroxide are added in sequence.

In one preferred embodiment, the entire core or at least one core layer in a multi-layered structure is formed of a rubber composition comprising a material selected from the group of natural and synthetic rubbers including, but not limited to, polybutadiene, polyisoprene, ethylene propylene rubber ("EPR"), ethylene-propylene-diene ("EPDM") rubber, styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof.

As discussed above, single and multi-layered cores can be made in accordance with this invention. In two-layered cores, a thermoset material such as, for example, thermoset rubber, can be used to make the outer core layer or a thermoplastic material such as, for example, ethylene acid copolymer containing acid groups that are at least partially or fully neutralized can be used to make the outer core layer. Suitable ionomer compositions include partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers. Suitable ethylene acid copolymer ionomers and other thermoplastics that can be used to form the core layer(s) are the same materials that can be used to make an inner cover layer as discussed further below.

Suitable thermoplastic materials that can be used to form a core layer in accordance with this invention include traditional O/X- and O/X/Y-type acid copolymers, wherein O is an α-olefin, X is a $C_3$-$C_8$ α,β-ethylenically unsaturated carboxylic acid, and Y is a softening monomer. O is preferably selected from ethylene and propylene. X is preferably selected from methacrylic acid, acrylic acid, ethacrylic acid, crotonic acid, and itaconic acid. Methacrylic acid and acrylic acid are particularly preferred. Y is preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate. These thermoplastic acid polymers and corresponding ionomers can be plasticized or non-plasticized.

Examples of O/X and O/X/Y-type acid copolymers include, without limitation, ethylene acid copolymers, such as ethylene/(meth)acrylic acid, ethylene/(meth)acrylic acid/maleic anhydride, ethylene/(meth)acrylic acid/maleic acid mono-ester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/(meth)acrylic acid/methyl (meth)acrylate, ethylene/(meth)acrylic acid/ethyl (meth)acrylate terpolymers, and the like. Preferred α, β-ethylenically unsaturated mono- or dicarboxylic acids are (meth) acrylic acid, ethacrylic acid, maleic acid, crotonic acid, fumaric acid, itaconic acid. (Meth) acrylic acid is most preferred. As used herein, "(meth) acrylic acid" means methacrylic acid and/or acrylic acid. Likewise, "(meth) acrylate" means methacrylate and/or acrylate.

In yet another example, a three-layered core is made. For example, a core assembly having inner and outer core layers, wherein an intermediate core layer is disposed between the two core layers, may be prepared.

The inner core may be formed by any suitable technique including compression and injection molding methods. The outer core layer, which surrounds the inner core, is formed by molding compositions over the inner core. Compression or injection molding techniques may be used to form the other layers of the core assembly. Then, the cover layers are applied over the core assembly. Prior to this step, the core structure may be surface-treated to increase the adhesion between its outer surface and the next layer that will be applied over the core. Such surface-treatment may include mechanically or chemically-abrading the outer surface of the core. For example, the core may be subjected to corona-discharge, plasma-treatment, silane-dipping, or other treatment methods known to those in the art.

Figure 2:
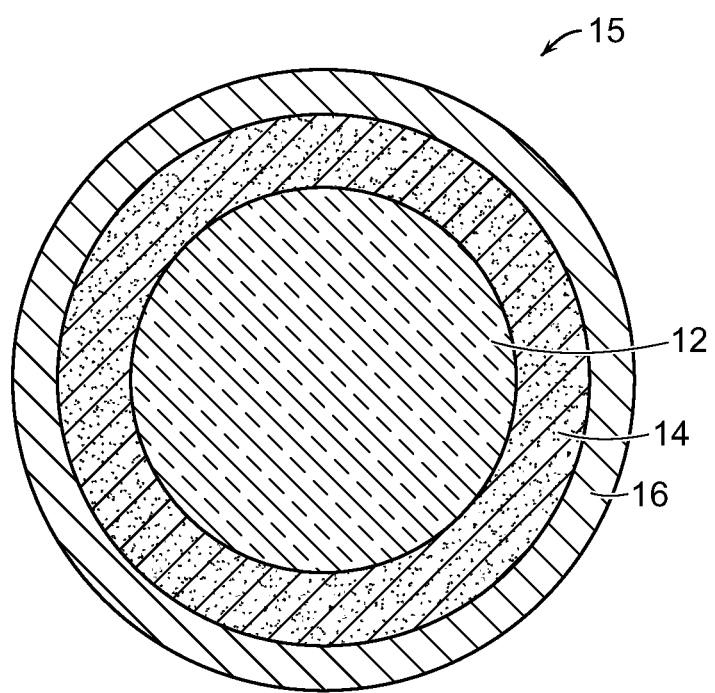
FIG. 2 is a cross-sectional view of a three-piece golf ball having a two-layered core and single-layered cover made in accordance with the present invention.
Figure 3:
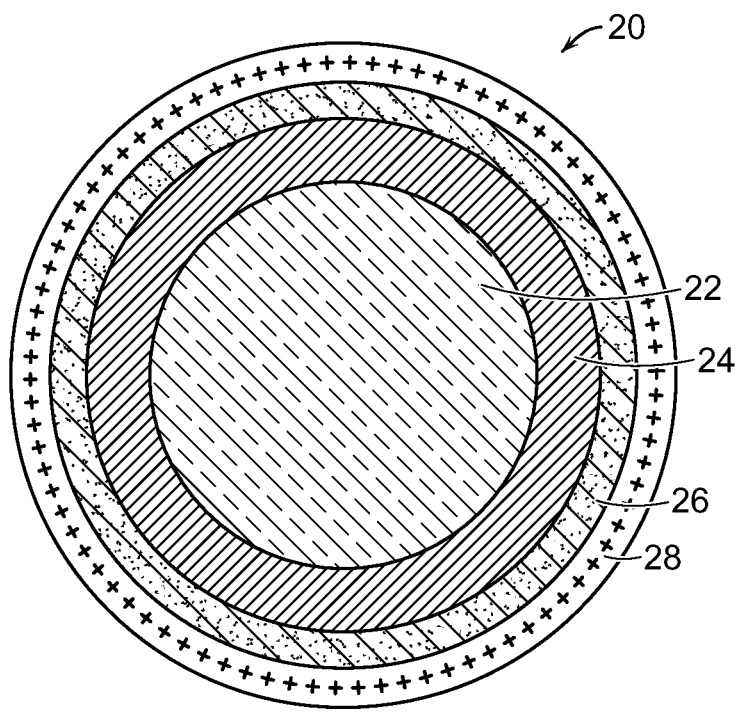
FIG. 3 is a cross-sectional view of a four-piece golf ball having a two-layered core and two-layered cover made in accordance with the present invention.
Figure 4:
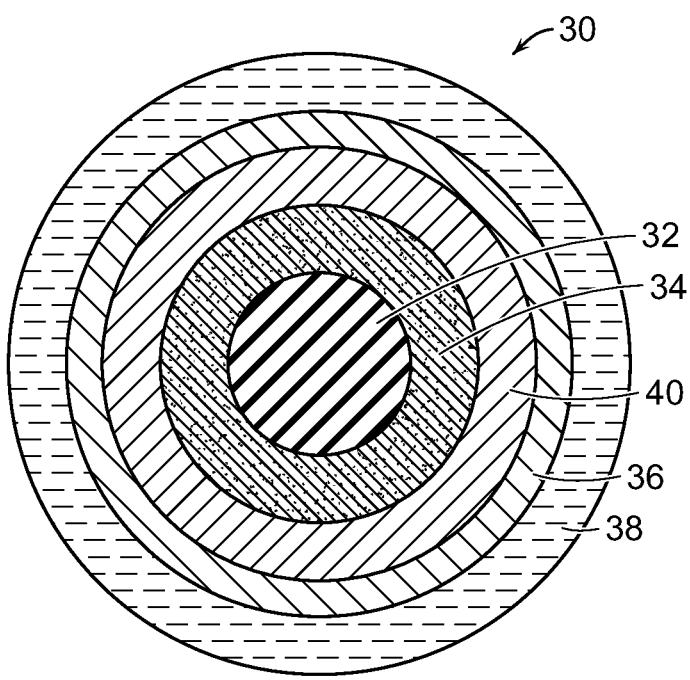
FIG. 4 is a cross-sectional view of a five-piece golf ball having a two-layered core and two-layered cover with an intermediate layer disposed between the core and cover, made in accordance with the present invention.

As discussed above, in one embodiment, the core has a dual-layered structure. As shown in FIG. 1, the core (10) includes an inner core (center) (12) comprising a thermoplastic or thermoset composition. In one embodiment, the inner core is formed from the polybutadiene rubber/borophene-containing composition as described above. Meanwhile, the outer core layer (14), which surrounds the inner core, comprises a thermoplastic or thermoset composition. In another embodiment, the inner core is formed from a thermoplastic or thermoset composition; and the outer core is formed from the polybutadiene rubber/borophene-containing composition as described above. In FIG. 2, another version of a golf ball is shown, particularly a three-piece golf ball (15) having a dual-layered core (inner core (12) and outer core layer (14)) surrounded by a single-layered cover (16). Referring to FIG. 3, in another version, the four-piece golf ball (20) contains a dual-core having an inner core (22) and outer core layer (24). The dual-core is surrounded by a multi-layered cover having an inner cover layer (26) and outer cover layer (28). Finally, in FIG. 4, the five-piece golf ball (30) contains a dual-core having an inner core (32) and outer core layer (34). The dual-core is surrounded by a multi-layered cover having an inner cover layer (36) and outer cover layer (38). An intermediate layer (40) is disposed between the core and cover sub-structures.

Different ball constructions can be made using the core constructions of this invention as shown in FIGS. 1-4 discussed above. Such golf ball constructions include, for example, four-piece, five-piece, and six-piece constructions. It should be understood the golf balls shown in FIGS. 1-4 are for illustrative purposes only, and they are not meant to be restrictive. Other golf ball constructions can be made in accordance with this invention.

Golf balls made in accordance with this invention can be of any size, although the USGA requires that golf balls used in competition have a diameter of at least 1.68 inches. For play outside of USGA rules, the golf balls can be of a smaller size. Normally, golf balls are manufactured in accordance with USGA requirements and have a diameter in the range of about 1.68 to about 1.80 inches. There is no upper size limit so some golf balls, if desired, can be made having an overall diameter greater than 1.80 inches, for example, 1.82 or 1.83 or 1.85 or even greater. Preferably, the golf ball diameter is about 1.68 to 1.74 inches, more preferably about 1.68 to 1.70 inches.

The inner core can be relatively small in volume, for example, it may have a diameter within a range of about 0.10 to about 1.10 inches. More particularly, the inner core may have a diameter size with a lower limit of about 0.15 or 0.25 or 0.35 or 0.45 or 0.55 inches and an upper limit of about 0.60 or 0.70 or 0.80 or 0.90 inches. In one embodiment, the diameter of the inner core is in the range of about 0.025 to about 0.080 inches, more preferably about 0.030 to about 0.075 inches. Meanwhile, the outer core layer may have a thickness within a range of about 0.010 to about 0.250 inches. For example, the outer core may have a thickness with a lower limit of 0.010 or 0.020 or 0.025 or 0.030 inches and an upper limit of 0.070 or 0.080 or 0.100 or 0.200 inches. In one embodiment, the outer core layer has a thickness in the range of about 0.040 to about 0.170 inches.

The United States Golf Association (USGA) has established a maximum weight of 45.93 g (1.62 ounces) for golf balls. For play outside of USGA rules, the golf balls can be heavier. Thus, in such outside of the USGA cases, the balls can have a weight greater than 1.62 ounces. In one preferred embodiment, the weight of the multi-layered core is in the range of about 28 to about 38 grams.

The hardness of the core sub-assembly (inner core and outer core layer) is an important property. In one preferred golf ball, the inner core (center) has a "positive" hardness gradient (that is, the outer surface of the inner core is harder than its geometric center); and the outer core layer has a "positive" hardness gradient (that is, the outer surface of the outer core layer is harder than the inner surface of the outer core layer.) In such cases where both the inner core and outer core layer each has a "positive" hardness gradient, the outer surface hardness of the outer core layer is preferably greater than the hardness of the geometric center of the inner core.

In an alternative version, the inner core may have a positive hardness gradient; and the outer core layer may have a "zero" hardness gradient (that is, the hardness values of the outer surface of the outer core layer and the inner surface of the outer core layer are substantially the same) or a "negative" hardness gradient (that is, the outer surface of the outer core layer is softer than the inner surface of the outer core layer.) In a second alternative version, the inner core may have a zero or negative hardness gradient; and the outer core layer may have a positive hardness gradient. Still yet, in another embodiment, both the inner core and outer core layers have zero or negative hardness gradients.

The core layers have positive, negative, or zero hardness gradients defined by hardness measurements made at the outer surface of the inner core (or outer surface of the outer core) and radially inward towards the center of the inner core (or inner surface or midpoint of the outer core). These measurements are made typically at 2-mm increments as described in the test methods below. In general, the hardness gradient is determined by subtracting the hardness value at the innermost portion of the component being measured (for example, the center of the inner core or inner surface or midpoint of the intermediate layer) from the hardness value at the outer surface of the component being measured (for example, the outer surface of the inner core or outer surface of the intermediate layer).

The inner core preferably has a geometric center hardness ($H_{inner\ core\ center}$) of about 5 Shore D or greater. For example, the ($H_{inner\ core\ center}$) may be in the range of about 5 to about 88 Shore D and more particularly within a range having a lower limit of about 5 or 10 or 18 or 20 and an upper limit of about 80 or 82 or 84 or 88 Shore D. In another example, the center hardness of the inner core ($H_{inner\ core\ center}$), as measured in Shore C units, is preferably about 10 Shore C or greater; for example, the $H_{inner\ core\ center}$ may have a lower limit of about 10 or 14 or 16 or 20 and an upper limit of about 78 or 80 or 84 or 90 Shore C. Concerning the outer surface hardness of the inner core ($H_{inner\ core\ surface}$), this hardness is preferably about 12 Shore D or greater; for example, the $H_{inner\ core\ surface}$ may fall within a range having a lower limit of about 12 or 15 or 18 or 20 and an upper limit of about 80 or 84 or 86 or 90 Shore D. In one version, the outer surface hardness of the inner core ($H_{inner\ core\ surface}$), as measured in Shore C units, has a lower limit of about 13 or 15 or 18 or 20 and an upper limit of about 86 or 88 or 90 or 92 Shore C. In another version, the geometric center hardness ($H_{inner\ core\ center}$) is in the range of about 10 Shore C to about 50 Shore C; and the outer surface hardness of the inner core ($H_{inner\ core\ surface}$) is in the range of about 5 Shore C to about 50 Shore C.

On the other hand, the outer core layer preferably has an outer surface hardness ($H_{outer\ surface\ of\ OC}$) of about 40 Shore D or greater, and more preferably within a range having a lower limit of about 40 or 42 or 44 or 46 and an upper limit of about 85 or 87 or 88 or 90 Shore D. The outer surface hardness of the outer core layer ($H_{outer\ surface\ of\ OC}$), as measured in Shore C units, preferably has a lower limit of about 40 or 42 or 45 or 48 and an upper limit of about 88 or 90 or 92 or 95 Shore C. And, the midpoint hardness of the outer core layer ($H_{midpoint\ of\ OC}$) preferably has a hardness of about 40 Shore D or greater, and more preferably within a range having a lower limit of about 40 or 42 or 46 or 48 or 50 and an upper limit of about 80 or 82 or 85 or 88 or 90 Shore D. The midpoint hardness of the outer core layer ($H_{midpoint\ of\ OC}$), as measured in Shore C units, preferably has a lower limit of about 40 or 42 or 44 or 45 or 47 and an upper limit of about 85 or 88 or 90 or 92 or 95 Shore C.

The midpoint of a layer is taken at a point equidistant from the inner surface and outer surface of the layer to be measured, most typically an outer core layer. Once one or more core layers surround a layer of interest, the exact midpoint may be difficult to determine, therefore, for the purposes of the present invention, the measurement of "midpoint" hardness of a layer is taken within plus or minus 1 mm of the measured midpoint of the layer.

The core structure also has a hardness gradient across the entire core assembly. In one embodiment, the ($H_{inner\ core\ center}$) is in the range of about 10 Shore C to about 60 Shore C, preferably about 13 Shore C to about 55 Shore C; and the ($H_{outer\ surface\ of\ OC}$) is in the range of about 65 to about 96 Shore C, preferably about 68 Shore C to about 94 Shore C to provide a positive hardness gradient across the core assembly. In another embodiment, there is a zero or negative hardness gradient across the core assembly. For example, the center of the core ($H_{inner\ core\ center}$) may have a hardness gradient in the range of 20 to 90 Shore C; and the outer surface of the outer core may have a hardness gradient in the range of 10 to 80 Shore C. The hardness gradient across the core assembly will vary based on several factors including, but not limited to, the dimensions of the inner core, intermediate core, and outer core layers.

Cover Structure

As noted above, the golf ball assembly generally comprises a core that is enclosed with a protective cover layer. The ball may contain one or more cover layers. For example, a golf ball having a single-layered cover may be made. In another version, a golf ball having a two-layered cover including inner and outer cover layers may be made. In yet another version, a three-layered cover including inner, intermediate, and outer cover layers may be made. As discussed above, the borophene-containing composition of this invention can be used to make any cover layer. Also, conventional thermoset and thermoplastic compositions can be used to make a cover layer in accordance with this invention.

The cover layers of this invention provide the ball with a variety of advantageous mechanical and playing performance properties as discussed further below. In general, the hardness and thickness of the different cover layers may vary depending upon the desired ball construction. In addition, as discussed above, an intermediate layer may be disposed between the core and cover layers. The cover layers preferably have good impact durability, toughness, and wear-resistance.

Suitable conventional materials that can be used to form a cover layer include, but are not limited to, polyurethanes; polyureas; copolymers, blends and hybrids of polyurethane and polyurea; olefin-based copolymer ionomer resins (for example, Surlyn® ionomer resins and DuPont HPF® 1000, HPF® 2000, and HPF® 1035; and HPF® AD 1172, commercially available from DuPont; Iotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, commercially available from Arkema Inc; cross-linked trans-polyisoprene and blends thereof; polyester-based thermoplastic elastomers, such as Hytrel®, commercially available from DuPont or RiteFlex®, commercially available from Ticona Engineering Polymers; polyurethane-based thermoplastic elastomers, such as Elastollan®, commercially available from BASF; synthetic or natural vulcanized rubber; and combinations thereof. Castable polyurethanes, polyureas, and hybrids of polyurethanes-polyureas are particularly desirable because these materials can be used to make a golf ball having high resiliency and a soft feel. By the term, "hybrids of polyurethane and polyurea," it is meant to include copolymers and blends thereof.

Polyurethanes, polyureas, and blends, copolymers, and hybrids of polyurethane/polyurea are also particularly suitable. When used as the outer cover layer material, polyurethanes and polyureas can be thermoset or thermoplastic. Thermoset materials can be formed into golf ball layers by conventional casting or reaction injection molding techniques. Thermoplastic materials can be formed into golf ball layers by conventional compression or injection molding techniques.

The cover layers are formed over the core or ball sub-assembly (the core structure and any intermediate layers disposed about the core) using a suitable technique such as, for example, compression-molding, flip-molding, injection-molding, retractable pin injection-molding, reaction injection-molding (RIM), liquid injection-molding, casting, spraying, powder-coating, vacuum-forming, flow-coating, dipping, spin-coating, and the like. Preferably, each cover layer is separately formed over the ball sub-assembly. For example, an ethylene acid copolymer ionomer composition may be injection-molded to produce half-shells. Alternatively, the ionomer composition can be placed into a compression mold and molded under sufficient pressure, temperature, and time to produce the hemispherical shells. The smooth-surfaced hemispherical shells are then placed around the core sub-assembly in a compression mold. Under sufficient heating and pressure, the shells fuse together to form an inner cover layer that surrounds the sub-assembly. In another method, the ionomer composition is injection-molded directly onto the core sub-assembly using retractable pin injection molding. An outer cover layer comprising a polyurethane or polyurea composition over the ball sub-assembly may be formed by using a casting process.

After the golf balls have been removed from the mold, they may be subjected to finishing steps such as flash-trimming, surface-treatment, marking, coating, painting, and the like using techniques known in the art.

Other Ball Constructions

It should be understood that the golf ball compositions and constructions described above are for illustrative purposes only, and they are not meant to be restrictive. Other golf ball compositions and constructions can be made in accordance with this invention. It is appreciated by those skilled in the art that various changes and additions can be made to the golf ball compositions and products without departing from the spirit and scope of this invention. It is intended that all such embodiments be covered by the appended claims.

I claim:

1. A golf ball, comprising:
   i) an inner core comprising a mixture of: a) a borophene material and b) polybutadiene rubber; the inner core having an outer surface hardness ($H_{inner\ core\ surface}$) and a center hardness ($H_{inner\ core\ center}$), the $H_{inner\ core\ surface}$ being greater than the $H_{inner\ core\ center}$ to provide a positive hardness gradient; and
   ii) an outer core layer comprising a thermoset or thermoplastic composition, the outer core layer being disposed about the inner core and having an outer surface hardness ($H_{outer\ surface\ of\ OC}$) and a midpoint hardness ($H_{midpoint\ of\ OC}$), the $H_{outer\ surface\ of\ OC}$ being greater than the $H_{midpoint\ of\ OC}$ to provide a positive hardness gradient; and
   iii) a cover having at least one layer.

2. The golf ball of claim 1, wherein the inner core comprises a mixture of about 0.1 to about 10 weight percent borophene material.

3. The golf ball of claim 1, wherein the inner core has a flexural modulus of about 70 to about 100 MPa.

4. The golf ball of claim 1, wherein the outer core layer comprises a thermoset rubber composition and the rubber is selected from the group consisting of polybutadiene, polyisoprene, ethylene-propylene, ethylene-propylene-diene, styrene-butadiene, and, polyalkenamer rubbers, and mixtures thereof.

5. The golf ball of claim 1, wherein the outer core layer comprises a thermoplastic composition, the composition comprising an ethylene acid copolymer containing acid groups such that greater than 70% of the acid groups are neutralized.

6. The golf ball of claim 5, wherein the ethylene acid copolymer is selected from the group consisting of: ethylene/(meth)acrylic acid/n-butyl acrylate; ethylene/(meth)acrylic acid/ethyl acrylate; ethylene/(meth)acrylic acid/methyl acrylate; ethylene/(meth)acrylic acid/isobutyl acrylate; and ethylene/(meth)acrylic acid copolymers; and blends thereof.

7. The golf ball of claim 1, wherein the ball has a compression in the range of about 25 to about 110.

8. A golf ball, comprising:
 i) an inner core comprising a thermoset or thermoplastic composition; the inner core having an outer surface hardness ($H_{inner\ core\ surface}$) and a center hardness ($H_{inner\ core\ center}$), the $H_{inner\ core}$ surface being greater than the H provide a positive inner core center to hardness gradient; and
 ii) an outer core comprising a mixture of: a) a borophene material; and b) polybutadiene rubber; the outer core layer being disposed about the inner core and having an outer surface hardness ($H_{outer\ surface\ of\ OC}$) and a midpoint hardness ($H_{midpoint\ of\ OC}$), the $H_{outer\ surface\ of\ OC}$ being greater than the $H_{midpoint\ of\ OC}$ to provide a positive hardness gradient; and
 iii) a cover having at least one layer.

9. The golf ball of claim 8, wherein the outer core comprises a mixture of about 0.1 to about 10 weight percent borophene material.

10. The golf ball of claim 8, wherein the outer core has a flexural modulus of about 70 to about 100 MPa.

11. The golf ball of claim 8, wherein the inner core comprises a thermoset rubber composition and the rubber is selected from the group consisting of polybutadiene, polyisoprene, ethylene-propylene, ethylene-propylene-diene, styrene-butadiene, and, polyalkenamer rubbers, and mixtures thereof.

12. The golf ball of claim 8, wherein the inner core comprises a thermoplastic composition, the composition comprising an ethylene acid copolymer containing acid groups such that greater than 70% of the acid groups are neutralized.

13. The golf ball of claim 12, wherein the ethylene acid copolymer is selected from the group consisting of: ethylene/(meth)acrylic acid/n-butyl acrylate; ethylene/(meth)acrylic acid/ethyl acrylate; ethylene/(meth)acrylic acid/methyl acrylate; ethylene/(meth)acrylic acid/isobutyl acrylate; and ethylene/(meth)acrylic acid copolymers; and blends thereof.

14. The golf ball of claim 8, wherein the ball has a compression in the range of about 25 to about 110.

* * * * *